US010631301B2

(12) United States Patent
Rico Alvarino et al.

(10) Patent No.: US 10,631,301 B2
(45) Date of Patent: Apr. 21, 2020

(54) POSITIONING REFERENCE SIGNAL ENHANCEMENTS

(71) Applicant: QUALCOMM Incorporated, San Diego, CA (US)

(72) Inventors: Alberto Rico Alvarino, San Diego, CA (US); Peter Gaal, San Diego, CA (US); Wanshi Chen, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 15/718,220

(22) Filed: Sep. 28, 2017

(65) Prior Publication Data

US 2018/0098314 A1    Apr. 5, 2018

Related U.S. Application Data

(60) Provisional application No. 62/402,680, filed on Sep. 30, 2016.

(51) Int. Cl.
*H04W 72/04* (2009.01)
*H04W 4/70* (2018.01)
*H04L 5/00* (2006.01)

(52) U.S. Cl.
CPC ......... *H04W 72/048* (2013.01); *H04L 5/0051* (2013.01); *H04W 4/70* (2018.02); *H04W 72/042* (2013.01)

(58) Field of Classification Search
CPC ...... H04W 72/048; H04W 64/00; H04W 4/02
USPC ............................ 455/456.1, 456.2; 370/329
See application file for complete search history.

(56) References Cited

U.S. PATENT DOCUMENTS

| 2013/0194931 | A1 | 8/2013 | Lee et al. |
| 2013/0308567 | A1 | 11/2013 | Chen et al. |
| 2014/0301268 | A1 | 10/2014 | Xu et al. |
| 2016/0295374 | A1* | 10/2016 | Persson ................. G01S 5/0036 |
| 2017/0289831 | A1* | 10/2017 | Park .......................... G01S 5/02 |
| 2017/0374640 | A1* | 12/2017 | Kim .......................... H04L 5/00 |
| 2018/0020423 | A1* | 1/2018 | Wang ..................... H04W 4/70 |
| 2018/0020459 | A1* | 1/2018 | Chatterjee ............. H04W 76/18 |

(Continued)

FOREIGN PATENT DOCUMENTS

| WO | 2011139201 A1 | 11/2011 |
| WO | 2013005855 A1 | 1/2013 |

OTHER PUBLICATIONS

International Search Report and Written Opinion—PCT/US2017/054478—ISA/EPO—dated Dec. 15, 2017.

(Continued)

*Primary Examiner* — Temica M Beamer
(74) *Attorney, Agent, or Firm* — Patterson & Sheridan, LLP

(57) ABSTRACT

Certain aspects of the present disclosure generally relate to wireless communications, and more specifically to positioning reference signal (PRS) enhancements for enhanced machine type communication (eMTC). An example method generally includes determining a first bandwidth within a larger system bandwidth to transmit a first positioning reference signal (PRS) to a first type of user equipment (UE), determining a second bandwidth within the system bandwidth to transmit a second PRS to a second type of UE, and transmitting information associated with the first PRS and the second PRS.

37 Claims, 8 Drawing Sheets

(56) References Cited

U.S. PATENT DOCUMENTS

2018/0097676 A1* 4/2018 Kazmi .................. H04L 5/0007
2018/0098187 A1* 4/2018 Blankenship ....... H04L 27/2602

OTHER PUBLICATIONS

ITL: "Support of OTDOA in NB-IoT", 3GPP DRAFT; R1-167752, 3rd Generation Partnership Project (3GPP), Mobile Competence Centre; 650, Route Des Lucioles; F-06921 Sophia-Anti Polls Cedex; France, vol. RAN WG1, No. Gothenburg, Sweden; Aug. 21, 2016, XP051126074, Retrieved from the Internet: URL:http://www.3gpp.org/ftp/Meetings_3GPP_SYNC/RAN1/Docs/ [retrieved on Aug. 21, 2016], 9 pages.

Sony: "Considerations on NB-IoT Positioning", 3GPP DRAFT; R1-166654, 3rd Generation Partnership Project (3gpp), Mobile Competence Centre, 650, Route Des Lucioles, F-06921 Sophia-Antipolis Cedex, France, vol. RAN WG1, No. Gothenburg, Sweden; Aug. 21, 2016, XP051125490, Retrieved from the Internet: URL:http://www.3gpp.org/ftp/Meetings_3GPP_SYNC/RAN1/Docs/ [retrieved on Aug. 21, 2016], 3 pages.

* cited by examiner

POSITIONING REFERENCE SIGNAL ENHANCEMENTS

CLAIM OF PRIORITY UNDER 35 U.S.C. § 119

This application claims benefit of U.S. Provisional Patent Application Ser. No. 62/402,680, filed Sep. 30, 2016, which is herein incorporated by reference in its entirety.

FIELD OF THE DISCLOSURE

Certain aspects of the present disclosure generally relate to wireless communications, and more specifically to positioning reference signal (PRS) enhancements for enhanced machine type communication (eMTC).

DESCRIPTION OF RELATED ART

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A wireless communication network may include a number of base stations that can support communication for a number of wireless devices. Wireless devices may include user equipments (UEs). Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example.

To enhance coverage of certain devices, such as MTC devices, "bundling" may be utilized in which certain transmissions are sent as a bundle of transmissions, for example, with the same information transmitted over multiple subframes.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a base station (BS). The method generally includes determining a first bandwidth within a larger system bandwidth to transmit a first positioning reference signal (PRS) to a first type of user equipment (UE), determining a second bandwidth within the system bandwidth to transmit a second PRS to a second type of UE, and transmitting information associated with the first PRS and the second PRS.

Certain aspects of the present disclosure provide an apparatus for wireless communications by a base station (BS). The apparatus generally includes means for determining a first bandwidth within a larger system bandwidth to transmit a first positioning reference signal (PRS) to a first type of user equipment (UE), means for determining a second bandwidth within the system bandwidth to transmit a second PRS to a second type of UE, and means for transmitting information associated with the first PRS and the second PRS.

Certain aspects of the present disclosure provide an apparatus for wireless communications by a base station (BS). The apparatus generally includes at least one processor configured to determine a first bandwidth within a larger system bandwidth to transmit a first positioning reference signal (PRS) to a first type of user equipment (UE), determine a second bandwidth within the system bandwidth to transmit a second PRS to a second type of UE, and transmit information associated with the first PRS and the second PRS. The apparatus also generally includes a memory coupled with the at least one processor.

Certain aspects of the present disclosure provide a non-transitory computer readable medium comprising code for determining a first bandwidth within a larger system bandwidth to transmit a first positioning reference signal (PRS) to a first type of user equipment (UE), determining a second bandwidth within the system bandwidth to transmit a second PRS to a second type of UE, and transmitting information associated with the first PRS and the second PRS.

Numerous other aspects are provided including methods, apparatus, systems, computer program products, computer-readable medium, and processing systems, for example, for performing techniques disclosed herein.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Aspects of the present disclosure provide techniques and apparatus for positioning reference signal (PRS) enhancements for enhanced machine type communication (eMTC). For example, aspects of the present disclosure provide techniques for increasing PRS density to help eMTC-type user equipments accurately receive PRS while keeping overhead to a minimum. In some cases, increasing PRS density while keeping overhead to a minimum may involve transmitting PRSs associated with different bandwidths in different subframes.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below. LTE and LTE-A are referred to generally as LTE.

Figure 1:
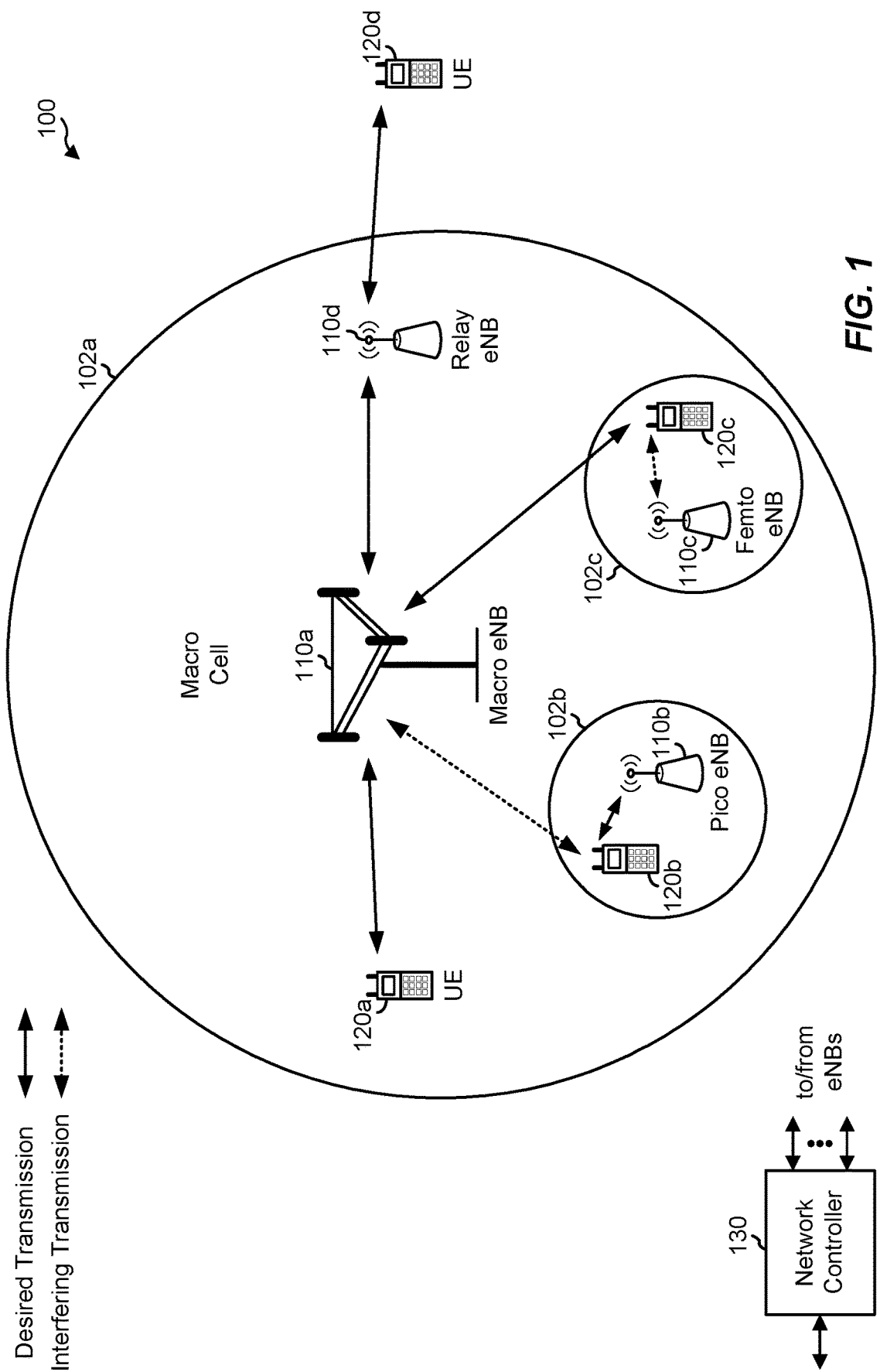
FIG. 1 is a block diagram conceptually illustrating an example wireless communication network, in accordance with certain aspects of the present disclosure.

FIG. 1 illustrates an example wireless communication network 100 with base stations (BSs) and user equipments (UEs), in which aspects of the present disclosure may be practiced.

The wireless communication network 100 may be an LTE network or some other wireless network. Wireless communication network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless communication network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay (station) eNB 110d may communicate with macro eNB 110a and a UE 120d in order to facilitate communication between eNB 110a and UE 120d. A relay station may also be referred to as a relay eNB, a relay base station, a relay, etc.

Wireless communication network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless communication network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless communication network 100, and each UE may be stationary or mobile. A UE may also be referred to as an access terminal, a terminal, a mobile station (MS), a subscriber unit, a station (STA), etc. Some examples of UEs may include cellular phones, smart phones, personal digital assistants (PDAs), wireless modems, a wireless communication device, handheld devices, navigation devices, gaming devices, cameras, tablets, laptop computers, netbooks, smartbooks, ultrabooks, cordless phones, wireless local loop (WLL) stations, wearable devices (e.g., smart glasses, smart goggles, smart watches, smart wristbands, smart bracelets, smart rings, smart jewelry, smart hats, smart clothing), etc. Some UEs may be considered machine-type communication (MTC) UEs, which may include remote devices, such as sensors, meters, monitors, location tags, drones, trackers, robots, etc., that may communicate with a base station, another remote device, or some other entity. MTC devices, as well as other types of devices, may include internet of everything (IoE) or internet-of-things (IoT) devices, such as NB-IoT (narrowband internet-of-things) devices, and techniques disclosed herein may be applied to MTC devices, NB-IoT devices, as well as other devices.

One or more UEs 120 in the wireless communication network 100 (e.g., an LTE network) may also be low cost (LC), low data rate devices, e.g., such as LC MTC UEs, LC eMTC UEs, etc. The LC UEs may co-exist with legacy and/or advanced UEs in the LTE network and may have one or more capabilities that are limited when compared to the other UEs (e.g., non-LC UEs) in the wireless network. For example, when compared to legacy and/or advanced UEs in the LTE network, the LC UEs may operate with one or more of the following: a reduction in maximum bandwidth (relative to legacy UEs), a single receive radio frequency (RF) chain, reduction of peak rate, reduction of transmit power, rank 1 transmission, half duplex operation, etc. As used herein, devices with limited communication resources, such as MTC devices, eMTC devices, etc. are referred to generally as LC UEs. Similarly, legacy devices, such as legacy and/or advanced UEs (e.g., in LTE) are referred to generally as non-LC UEs.

Figure 2:
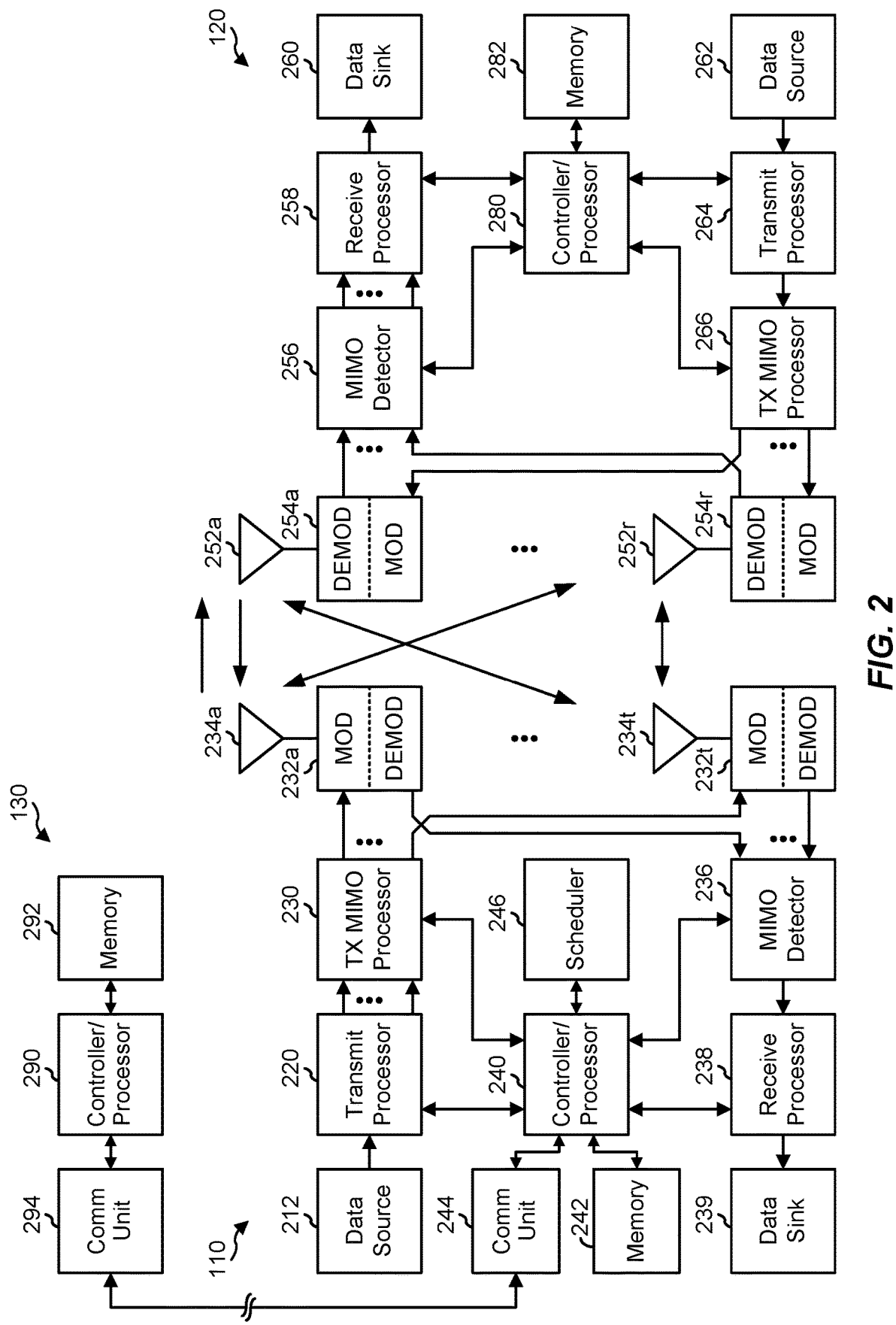
FIG. 2 is a block diagram conceptually illustrating an example of an evolved nodeB (eNB) in communication with a user equipment (UE) in a wireless communications network, in accordance with certain aspects of the present disclosure.

FIG. 2 is a block diagram of a design of eNB 110 and UE 120, which may be one of the eNBs 110 and one of the UEs 120, respectively, in FIG. 1. eNB 110 may be equipped with T antennas 234a through 234t, and UE 120 may be equipped with R antennas 252a through 252r, where in general $T \geq 1$ and $R \geq 1$.

At eNB 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each MOD 232 may process a respective output symbol stream (e.g., for OFDM, etc.) to obtain an output sample stream. Each MOD 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from eNB 110 and/or other BSs and may provide received signals to demodulators (DEMODs) 254a through 254r, respectively. Each DEMOD 254 may condition (e.g., filter, amplify, downconvert, and digitize) its received signal to obtain input samples. Each DEMOD 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by MODs 254a through 254r (e.g., for SC-FDM, OFDM, etc.), and transmitted to eNB 110. At eNB 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. eNB 110 may include communication unit 244 and communicate to network controller 130 via communication unit 244. Network controller 130 may include communication unit 294, controller/processor 290, and memory 292.

Controllers/processors 240 and 280 may direct the operation at eNB 110 and UE 120, respectively. For example, controller/processor 240 and/or other processors and modules at eNB 110 may perform or direct operations and/or processes for techniques described herein. Similarly, controller/processor 280 and/or other processors and modules at UE 120 may perform or direct operations and/or processes for the techniques described herein (e.g., those illustrated in FIG. 6). Memories 242 and 282 may store data and program codes for eNB 110 and UE 120, respectively. A scheduler 246 may schedule UEs for data transmission on the downlink and/or uplink.

Figure 3:
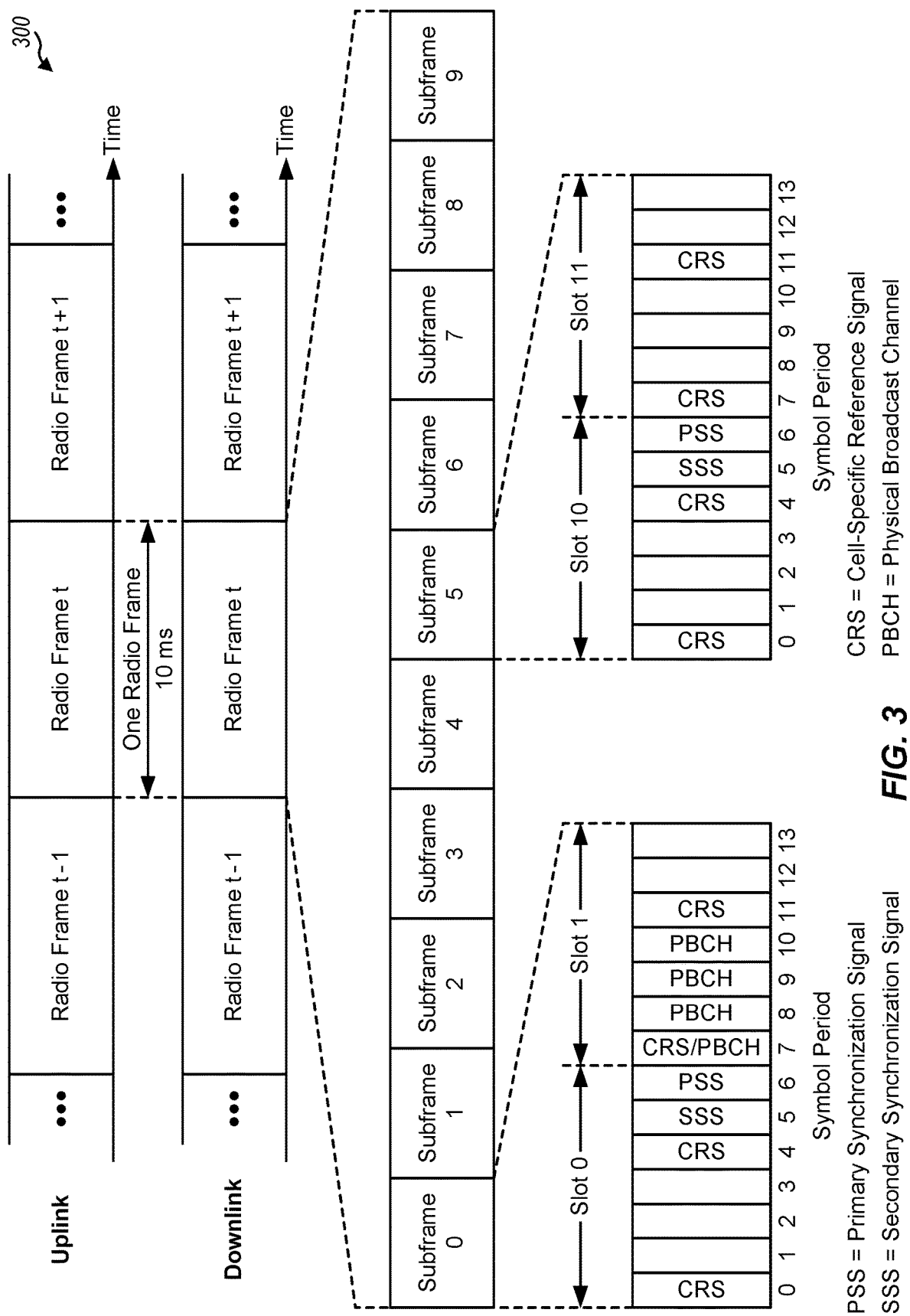
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data and/or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
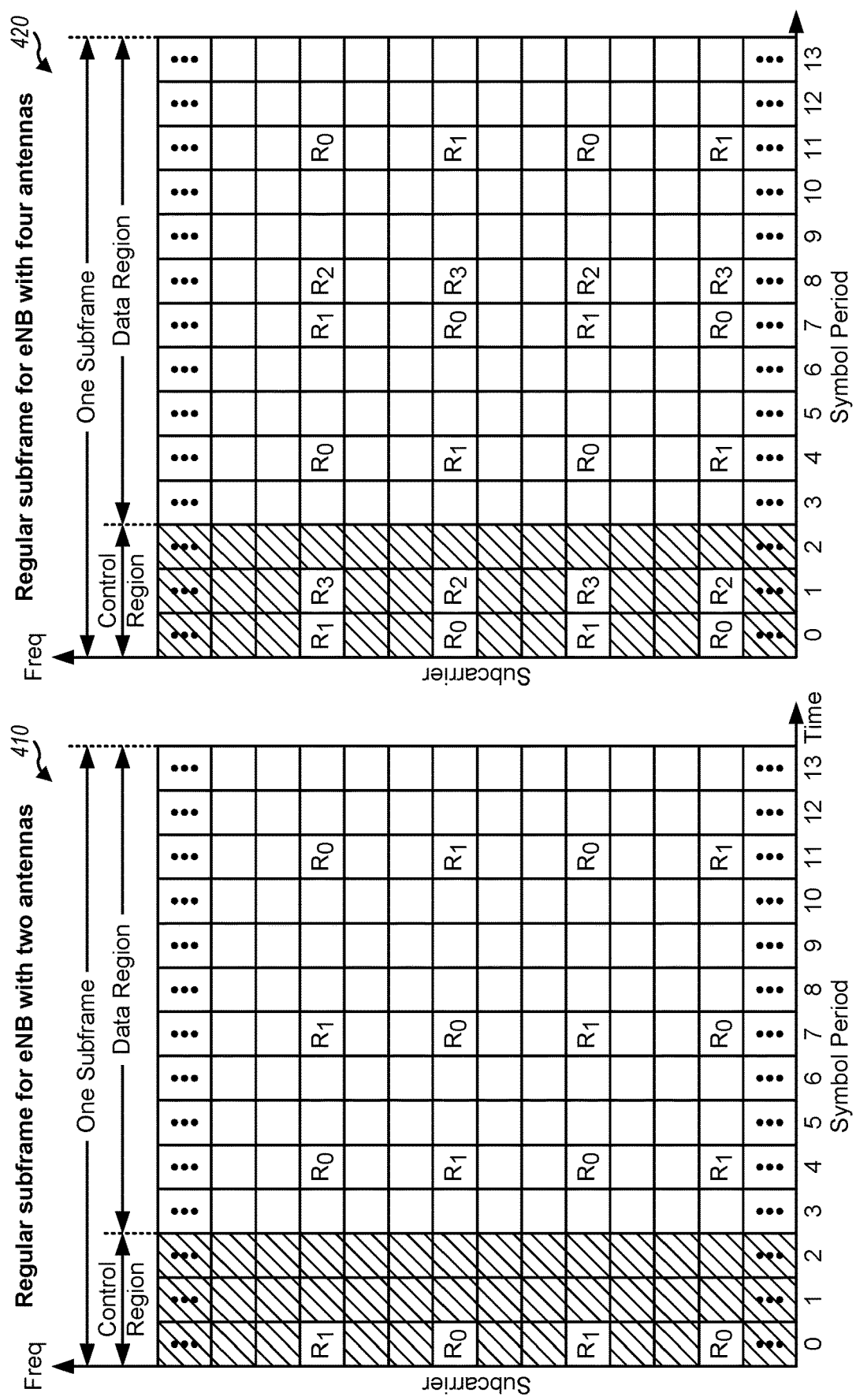
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

As mentioned above, one or more UEs in the wireless communication network (e.g., wireless communication network 100) may be devices that have limited communication resources, such as LC UEs, as compared to other (non-LC) devices in the wireless communication network.

In some systems, for example, in LTE Rel-13, the LC UE may be limited to a particular narrowband assignment (e.g., of no more than six resource blocks (RBs)) within the available system bandwidth. However, the LC UE may be able to re-tune (e.g., operate and/or camp) to different narrowband regions within the available system bandwidth of the LTE system, for example, in order to co-exist within the LTE system.

As another example of coexistence within the LTE system, LC UEs may be able to receive (with repetition) legacy physical broadcast channel (PBCH) (e.g., the LTE physical channel that, in general, carries parameters that may be used for initial access to the cell) and support one or more legacy physical random access channel (PRACH) formats. For example, the LC UE may be able to receive the legacy PBCH with one or more additional repetitions of the PBCH across multiple subframes. As another example, the LC UE may be able to transmit one or more repetitions of PRACH (e.g., with one or more PRACH formats supported) to an eNB in the LTE system. The PRACH may be used to identify the LC UE. Also, the number of repeated PRACH attempts may be configured by the eNB.

The LC UE may also be a link budget limited device and may operate in different modes of operation (e.g. entailing different amounts of repeated messages transmitted to or from the LC UE) based on its link budget limitation. For example, in some cases, the LC UE may operate in a normal coverage mode in which there is little to no repetition (e.g., the amount of repetition needed for the UE to successfully receive and/or transmit a message may be low or repetition may not even be needed). Alternatively, in some cases, the LC UE may operate in a coverage enhancement (CE) mode in which there may be high amounts of repetition. For example, for a 328 bit payload, a LC UE in CE mode may need 150 or more repetitions of the payload in order to successfully receive the payload.

In some cases, e.g., also for LTE Rel-13, the LC UE may have limited capabilities with respect to its reception of broadcast and unicast transmissions. For example, the maximum transport block (TB) size for a broadcast transmission received by the LC UE may be limited to 1000 bits. Additionally, in some cases, the LC UE may not be able to receive more than one unicast TB in a subframe. In some cases (e.g., for both the CE mode and normal mode described above), the LC UE may not be able to receive more than one broadcast TB in a subframe. Further, in some cases, the LC UE may not be able to receive both a unicast TB and a broadcast TB in a subframe.

For MTC, LC UEs that co-exist in the LTE system may also support new messages for certain procedures, such as paging, random access procedure, etc. (e.g., as opposed to conventional messages used in LTE for these procedures). In other words, these new messages for paging, random access procedure, etc. may be separate from the messages used for similar procedures associated with non-LC UEs. For example, as compared to conventional paging messages used in LTE, LC UEs may be able to monitor and/or receive paging messages that non-LC UEs may not be able to monitor and/or receive. Similarly, as compared to conventional random access response (RAR) messages used in a conventional random access procedure, LC UEs may be able to receive RAR messages that also may not be able to be received by non-LC UEs. The new paging and RAR messages associated with LC UEs may also be repeated one or more times (e.g., "bundled"). In addition, different numbers of repetitions (e.g., different bundling sizes) for the new messages may be supported.

Example MTC Coexistence within a Wideband System

Figure 5A:
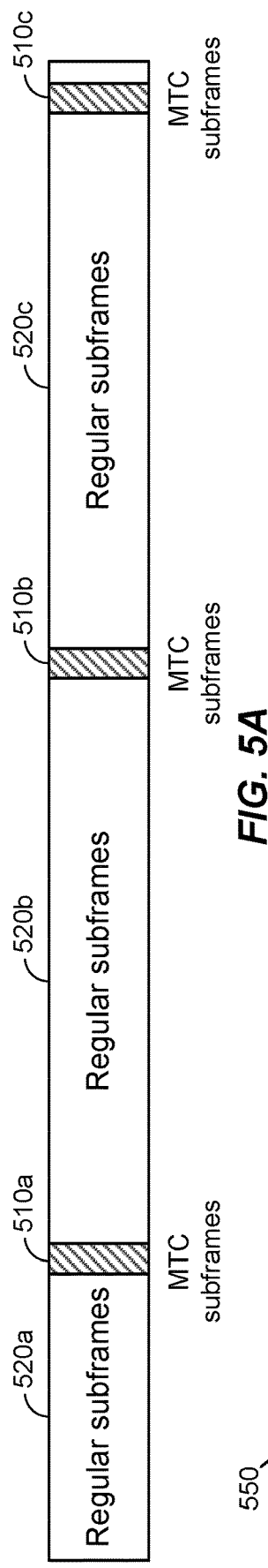
FIGS. 5A and 5B illustrate an example of MTC co-existence within a wideband system, such as LTE, in accordance with certain aspects of the present disclosure.
Figure 5B:
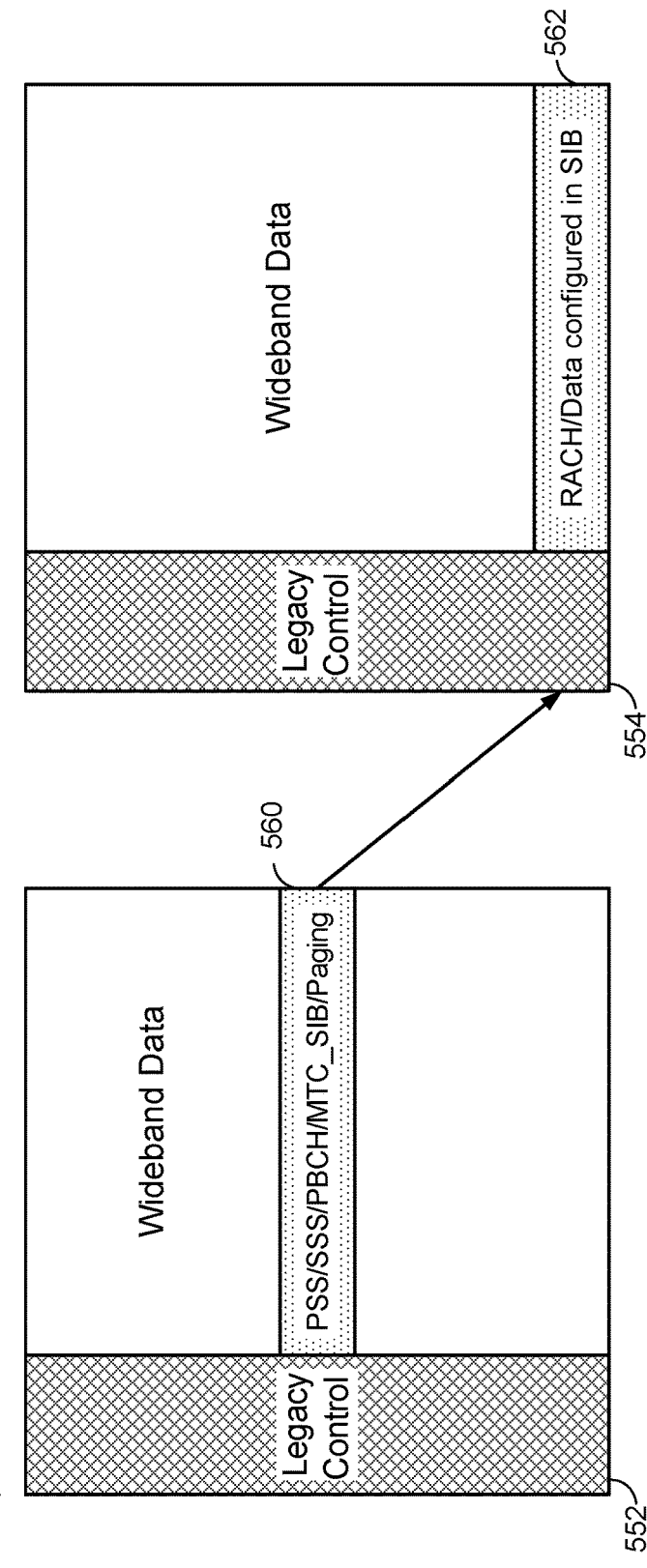

As mentioned above, MTC and/or eMTC operation may be supported in the wireless communication network (e.g., in coexistence with LTE or some other RAT). FIGS. 5A and 5B, for example, illustrate an example of how LC UEs in MTC operation may co-exist within a wideband system (e.g., 1.4/3/5/10/15/20 MHz), such as LTE.

As illustrated in the example frame structure of FIG. 5A, subframes 510 associated with MTC and/or eMTC operation may be time division multiplexed (TDM) with regular subframes 520 associated with LTE (or some other RAT).

Additionally or alternatively, as illustrated in the example frame structure of FIG. 5B, one or more narrowband regions 560, 562 used by LC UEs in MTC may be frequency division multiplexed within the wider bandwidth 550 supported by LTE. Multiple narrowband regions, with each narrowband region spanning a bandwidth that is no greater than a total of 6 RBs, may be supported for MTC and/or eMTC operation. In some cases, such as LTE Release 13, each LC UE in MTC operation may operate within one narrowband region (e.g., at 1.4 MHz or 6 RBs) at a time. In other cases, such as LTE Release 14, a LC UE in MTC operation may operate on a 5 MHz narrowband region (e.g., using 25 RBs).

At any given time, LC UEs in MTC operation may re-tune to other narrowband regions in the wider system bandwidth. In some examples, multiple LC UEs may be served by the same narrowband region. In yet other examples, different combinations of LC UEs may be served by one or more same narrowband regions and/or one or more different narrowband regions.

The LC UEs may operate (e.g., monitor/receive/transmit) within the narrowband regions for various different operations. For example, as shown in FIG. 5B, a first narrowband region 560 of a subframe 552 may be monitored by one or more LC UEs for either a PSS, SSS, PBCH, MTC signaling, or paging transmission from a BS in the wireless communication network. As also shown in FIG. 5B, a second narrowband region 562 of a subframe 554 may be used by LC UEs to transmit a RACH or data previously configured in signaling received from a BS. In some cases, the second narrowband region may be utilized by the same LC UEs that utilized the first narrowband region (e.g., the LC UEs may have re-tuned to the second narrowband region to transmit after monitoring in the first narrowband region). In some cases (although not shown), the second narrowband region may be utilized by different LC UEs than the LC UEs that utilized the first narrowband region.

In certain systems, eMTC UEs may support narrowband operation while operating in a wider system bandwidth. For example, an eMTC UE may transmit and receive in a narrowband region of a system bandwidth. As noted above, the narrowband region may span 6 resource blocks (RBs). In other cases, the narrowband region may span 25 RBs.

Certain systems may provide MTC UEs with coverage enhancements of up to 15 dB, which maps to 155.7 dB maximum coupling loss between the UE and an eNB. Accordingly, eMTC UEs and eNB may perform measurements at low SNRs (e.g., −15 dB to −20 dB). In some systems, coverage enhancements may include channel bundling, wherein messages associated with eMTC UEs may be repeated (e.g., bundled) one or more times.

Although the examples described herein assume a narrowband of 6 RBs, those skilled in the art will recognize that the techniques presented herein may also be applied to different sizes of narrowband regions (e.g., 25 RBs).

Example Sounding Reference Signal Transmissions in Enhanced Machine Type Communication Positioning reference signals (PRSs) were introduced in LTE Release 9 to assist in determining the location of User Equipment (UE) based on radio access network information. In general, PRS signals may be transmitted within predefined bandwidth and according to a set of configuration parameters such as subframe offset, periodicity, and duration. The PRS bandwidth may be configurable on a per-cell basis, where 1.4, 3, 5, 10, 15, and 20 MHz bandwidths are supported. However, regardless of the bandwidth, PRS is transmitted in the center resource blocks of a given bandwidth. Additionally, in some cases, PRS periodicity may be fixed such that all repetitions of PRS use the same bandwidth.

Further, each cell may apply a different muting pattern (defining times where that cell does not transmit PRS) in an effort to avoid interference with PRS transmitted from other cells. PRS may be transmitted at pre-defined subframes and repeated (e.g., in several consecutive subframes, with each set of subframes referred to as a "positioning occasion"). The sequence transmitted as a PRS may be based on any suitable known sequence. PRS from different cells may be multiplexed in the code domain (e.g., each cell transmitting a different (orthogonal) PRS sequence), in the frequency domain (e.g., at different frequency offsets), and/or in the time domain (e.g., using time based blanking).

As noted above, PRSs are used in determining the location of UE, for example, based on radio access network information. The process of determining the location of a UE follows three major steps. For example, a UE may first receive PRSs from its serving cell and neighboring cells. Based on the received PRSs, the UE may measure observed time difference of arrival (OTDOA) and report a Reference Signal Time Difference (RSTD) measurement to its serving cell. The network may then use the RSTD measurement to calculate the longitude and latitude of the UE.

LTE Release 14 proposes certain enhancements to OTDOA, which relate to specific aspects of eMTC operation, such as narrowband operation, enhanced coverage, and single receive (RX) antennas. However, current enhancements may not address certain issues associated with eMTC operation. For example, in eMTC, narrowband UEs may need more PRS density (e.g., more repetitions) as these UEs have a poor link budget, a single RX, and operate at a reduced bandwidth. However, PRS uses a single bandwidth across all repetitions and using a large bandwidth (e.g., necessary for wideband UEs) with many repetitions will result in increased overhead.

Thus, aspects of the present disclosure propose techniques for improving PRS operations for eMTC operation, for example, by allowing for increased PRS density while keeping overhead to a minimum. In some cases, increasing PRS density while keeping overhead to a minimum may involve transmitting PRSs associated with different bandwidths in different subframes.

Figure 6:
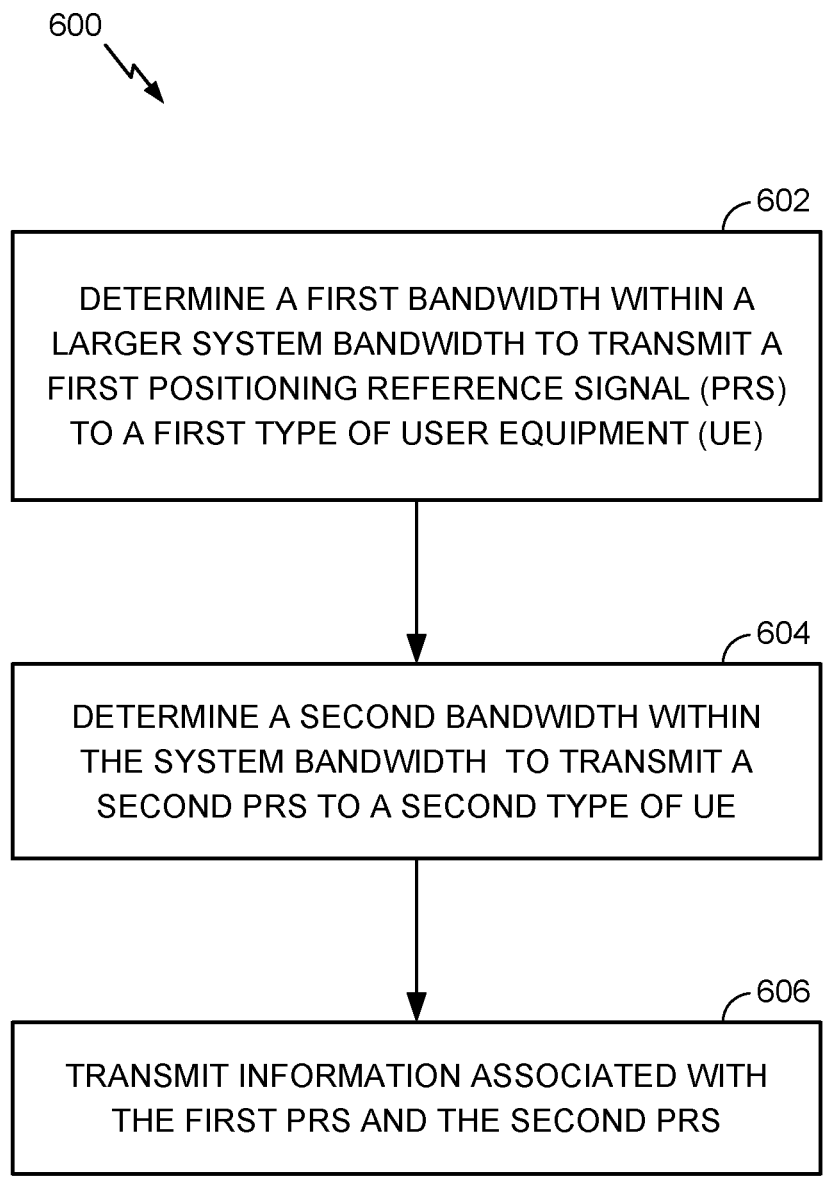
FIG. 6 illustrates an exemplary operation for wireless communications that may be performed by a base station (BS), in accordance with certain aspects of the present disclosure.

FIG. 6 illustrates example operations 600 for wireless communications in a network, for example, in accordance with certain aspects presented herein. According to certain aspects, operations 600 may be performed by a base station, such as eNB 110. Operations 600 may help increase PRS density while keeping overhead to a minimum.

According to certain aspects, the base station may include one or more components as illustrated in FIG. 2 that may be configured to perform the operations described herein. For example, the antenna 234, demodulator/modulator 232, controller/processor 240, and/or memory 242 as illustrated in FIG. 2 may perform the operations described herein.

Operations 600 begin at 602 by determining a first bandwidth within a larger system bandwidth to transmit a first positioning reference signal (PRS) to a first type of user equipment (UE). In some cases, the first type of UE may comprise a narrowband UE capable of narrowband communication with the network on a narrowband region (e.g., 1.4 MHz/5 MHz) of a larger system bandwidth.

At 604, the base station determines a second bandwidth within the system bandwidth to transmit a second PRS to a second type of UE. In some cases, the second type of UE comprises a wideband UE not capable of narrowband communication with the network.

At 606, the base station transmits information associated with the first PRS and the second PRS.

Figure 7:
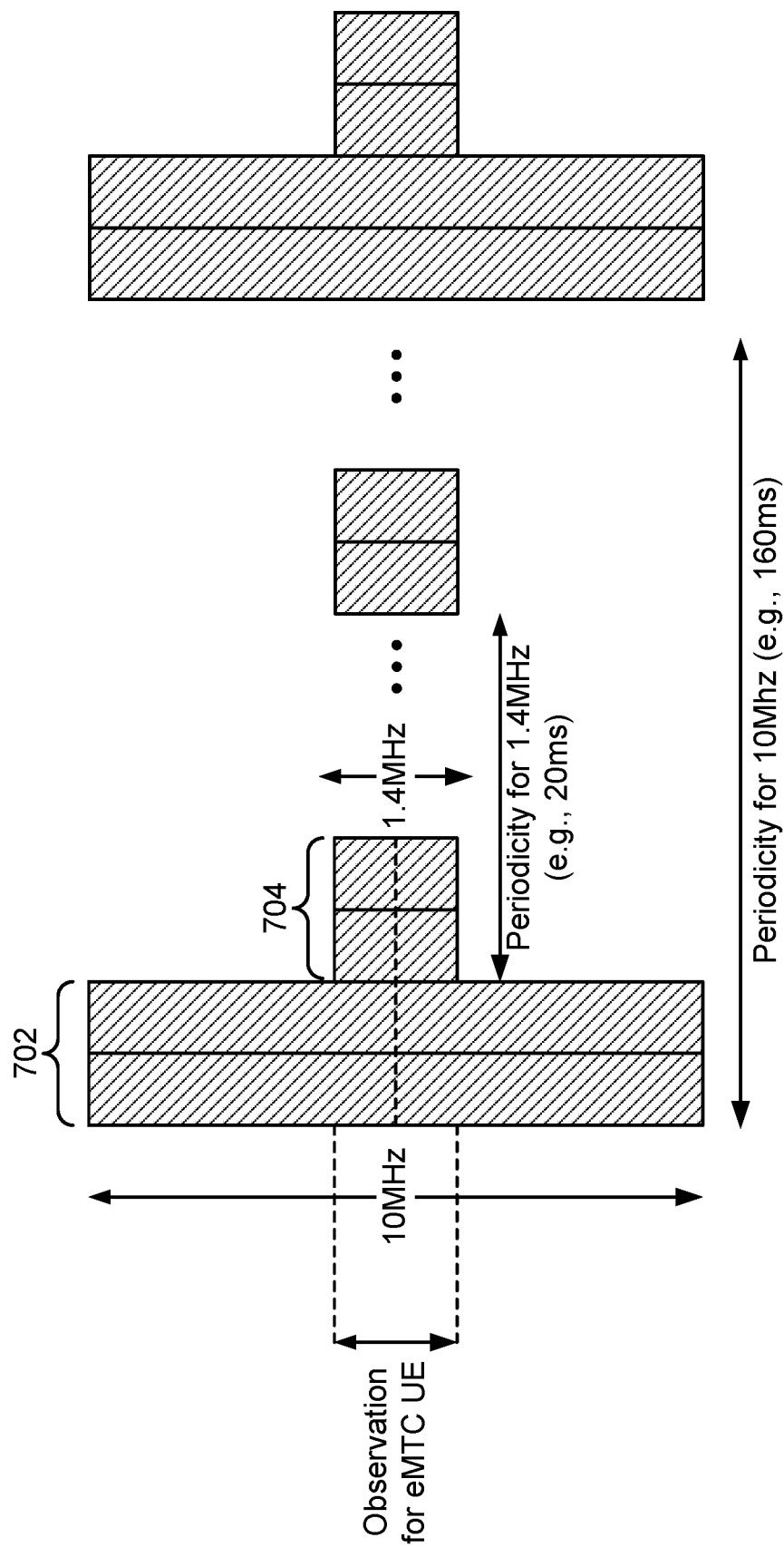
FIG. 7 illustrates an example PRS operation, in accordance with certain aspects of the present disclosure.

According to certain aspects, operations 600 may allow the base station to increase PRS density while keeping overhead to a minimum by transmitting PRSs associated with different bandwidths (and types of UEs operating in those bandwidths) in different subframes, for example, as illustrated in FIG. 7.

FIG. 7 illustrates an example PRS operation, in accordance with certain aspects of the present disclosure. For example, as illustrated, a first PRS for 10 MHz bandwidth (e.g., for wideband UEs) may be transmitted by the base station in a first two subframes (e.g., 702) followed by a second PRS for 1.4 MHz bandwidth (e.g., for narrowband UEs) transmitted in the next two subframes (e.g., 704). Additionally, the periodicity associated with the first and second PRSs may be different. For example, as illustrated in FIG. 7, the base station may set the periodicity for the PRS transmitted for 1.4 MHz bandwidth to be more frequent (e.g., 20 ms) than the periodicity for the PRS for 10 MHz (e.g., 160 ms). According to certain aspects, setting the periodicity for PRSs for 1.4 MHz bandwidth (i.e., for narrowband UEs) to be more frequent may help narrowband UEs receive the PRSs correctly, for example, since these UEs are link budget and power limited.

In addition to determining bandwidths for transmitting PRSs, aspects of the present disclosure provide techniques for configuring UEs to receive the PRSs. For example, in some cases, PRS configuration information transmitted by the base station (e.g., via a unicast message from a positioning server through higher layers) to both eMTC UEs (e.g., narrowband UEs) and non-eMTC UEs (e.g., wideband UEs) may be the same. For example, in a first example, for each bandwidth value (e.g., 1.4, 10 MHz, etc.), the base station may be configured to signal a subset of the following: periodicity, bandwidth, muting pattern, and number of consecutive subframes. For example, for a first PRS transmitted on 1.4 MHz bandwidth, the PRS configuration information will indicate the bandwidth (e.g., 1.4 MHz) to receive the first PRS, a periodicity at which the first PRS is to be transmitted, a muting pattern for the first PRS, and/or a number of consecutive subframes for receiving the first PRS. Further, for a second PRS transmitted on 10 MHz bandwidth, the PRS configuration information will indicate the bandwidth (e.g., 10 MHz) to receive the second PRS, a periodicity at which the second PRS is to be transmitted, a muting pattern for the second PRS, and/or a number of consecutive subframes for receiving the second PRS. Additionally, the base station may signal an offset between the bandwidth values in order to avoid collision between different bandwidth PRS values.

In another example, the base station may transmit PRS configuration information indicating a single PRS periodicity (and in some cases a muting pattern) and information specific to each PRS transmitted, such as bandwidth, number of consecutive subframes, and (in some cases) a muting pattern. For example, assume the base station intends to transmit a first PRS on 1.4 MHz bandwidth and a second PRS on 10 MHz bandwidth. In this case, the PRS configuration information may comprise a single periodicity for both the first PRS and the second PRS, a bandwidth to receive each of the first PRS and the second PRS, a muting pattern for each of the first PRS and the second PRS, and a number of consecutive subframes for receiving each of the first PRS and the second PRS. For example, the periodicity may be 160 ms, and the muting pattern may be {10 MHz, 2SF},{1.4 MHz, 4SF}. In such a case, for each period, the UE expects two subframes with PRS for 10 Mhz bandwidth followed by four subframes with PRS for 1.4 MHz bandwidth.

According to certain aspects, once the base station has determined the PRS configuration information, the base station may transmit the PRS configuration to both the narrowband (e.g., eMTC) UEs and the wideband (e.g., non-eMTC) UEs. Additionally, the base station may transmit legacy PRS configuration information (i.e., including a single PRS) to legacy UEs (e.g., UEs operating according to a release version for which multiple PRS bandwidth transmission is not supported), indicating PRS transmissions scheduled around the RBs used for narrowband PRSs.

In some cases, the configuration of PRSs for narrowband UEs and wideband UEs may be different. For example, in some cases, the PRS configuration information may comprise legacy PRS configuration information (e.g., for 20 MHz bandwidth), such a as subframe offset, a periodicity, and a duration. However, in this case, the PRS configuration information may also comprise a bitmask indicating which subframes of the legacy PRS configuration are narrowband subframes. For example, a UE may receive PRS configuration information for a 20 MHz bandwidth from the base station. The PRS configuration information may indicate four subframes in which PRS will be transmitted and also a bitmask (e.g., 0,0,1,1) corresponding to the four subframes. The UE may interpret the bitmask as indicating that only 1.4 MHz (or 5 MHz) bandwidths are used for PRS transmission in the last two subframes.

According to certain aspects, in some cases, the base station may transmit this PRS configuration information (e.g., the legacy PRS configuration information), including the bitmask, to both narrowband UEs and wideband UEs. According to certain aspects, wideband UEs may ignore the bitmask. In other cases, the base station may transmit only the legacy PRS configuration information to wideband UEs (e.g., lacking the bitmask and/or adjusting the number of subframes accordingly), while transmitting both the legacy PRS configuration information and the bitmask to narrowband UEs.

In some cases, the base station may transmit PRS configuration information to a first UE (e.g., a narrowband UE, such as an eMTC UE), indicating a bandwidth less than or equal to a bandwidth desired by the first UE for operation. A second UE (e.g., a UE capable of communicating on a wider band, such as 5 MHz) may receive the legacy PRS configuration discussed above. For example, the first UE may receive a PRS configuration for 1.4 MHz and four subframes, and the second UE may receive a PRS configuration for 5 MHz and two subframes. In this case, in the first two subframes, the base station transmits PRS in the 5 MHz bandwidth, and in the latter two subframes, the base station transmits PRS in the 1.4 MHz bandwidth. The second UE may receive PRS only the first two subframes using 5 MHz and the first UE receives PRS in the 4 subframes using 1.4 MHz.

In some cases, a PRS transmitted in a narrowband region of a larger system bandwidth does not need to be centered within the system bandwidth. In this case, the base station may include in the PRS configuration information a frequency offset value, indicating how much the bandwidth in which the PRS is transmitted is shifted from the center of the system bandwidth. According to certain aspects, this frequency offset value may be unique to a cell. That is, the frequency offset value may be different for different cells.

In some cases, the signal for the narrowband PRS that is non-centered in system bandwidth can be generated by the base station using the wideband PRS as a guide. For example, the base station may generate the narrowband PRS first by generating a 10 MHz wideband PRS and thereafter using only the REs of the wideband PRS that correspond to the non-centered bandwidth. In other cases, the signal for the narrowband PRS that is non-centered can be generated by the base station using a centered PRS as a guide, for example, by taking the REs for centered PRS and assigning them to the non-centered part of the bandwidth.

Additionally or alternatively, the base station may signal a subband PRS muting configuration, indicating that PRS is muted in a particular part of the bandwidth. According to aspects, the muting pattern for a given cell allows the UE to measure PRS from other cells (i.e., to avoid interference). According to certain aspects, the muting pattern may be different for different cells.

Figure 8:
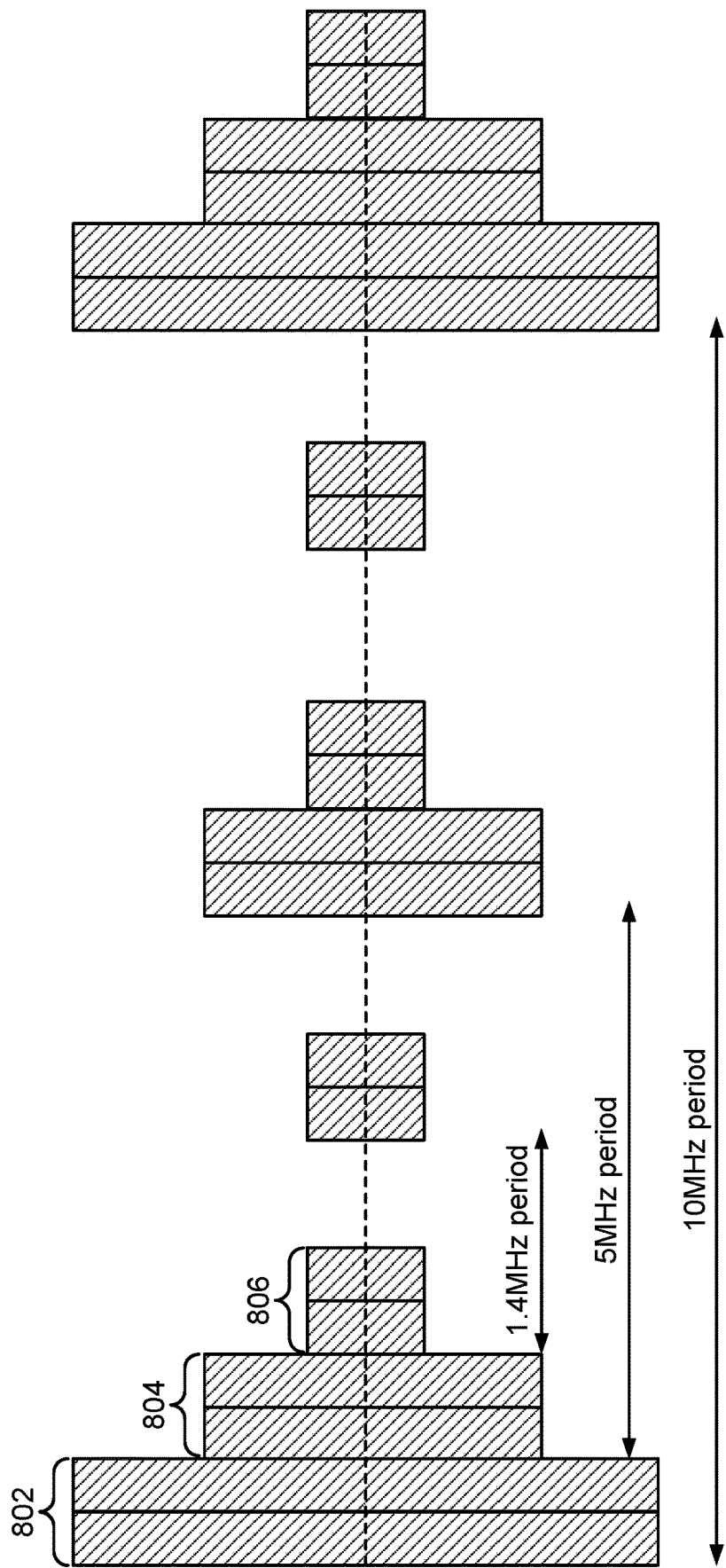
FIG. 8 illustrates an example PRS operation, in accordance with certain aspects of the present disclosure.

According to certain aspects, the techniques described above may be extended to a larger number of bandwidths, such as MTC UE with 1.4 MHz, FeMTC UE with 5 MHz, WB UE with 20 MHz. For example, as illustrated in FIG. 8, a first PRS may be transmitted in subframes 802 on a 10 MHz bandwidth at a first periodicity, a second PRS may be transmitted in subframes 804 on a 5 MHz bandwidth at a second periodicity, and a third PRS may be transmitted in subframes 806 on a 1.4 MHz bandwidth at a third periodicity.

According to certain aspects, whether a PRS is transmitted in a 10 MHz, 5 MHz, or 1.4 MHz bandwidth, RBs outside of the region of bandwidth used for PRS transmission may be used for other unicast or broadcast channels, such as the Machine Type Communication Physical Downlink Control Channel (MPDCCH) and/or the Physical Downlink Shared Channel (PDSCH).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for transmitting and/or means for receiving may comprise one or more antennas, such as antenna(s) 234 of the eNB 110 and/or antenna(s) 252 of the user equipment 120. Additionally, means for transmitting may comprise one or more processors (e.g., Transmit Processors 220/264 and/or Receive Processors 238/258) configured to transmit/receive via the one or more antennas. Further, means for determining, means for deciding, means for using, and/or means for performing may comprise one or more processors, such as the Transmit Processor 220, the Receive Processor 238, or the Controller/Processor 240 of the eNB 110 and/or the Transmit Processor 264, the Receive Processor 258, or the Controller/Processor 280 of the user equipment 120.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term receiver may refer to an RF receiver (e.g., of an RF front end) or an interface (e.g., of a processor) of a UE (e.g., UE 120) or BS (e.g., eNB 110) for receiving structures processed by an RF front end (e.g., via a bus). Similarly, the term transmitter may refer to an RF transmitter of an RF front end or an interface (e.g., of a processor) of a UE (e.g., UE 120) or BS (e.g., eNB 110) for outputting structures to an RF front end for transmission (e.g., via a bus). According to certain aspects, a receiver and transmitter may be configured to perform operations described herein. Additionally a transmitter may be configured to perform any transmitting functions described herein such as transmitting information associated with one or more PRSs scheduled in different bandwidths.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a c c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications in a network, comprising:
   determining a first bandwidth within a larger system bandwidth to transmit a first positioning reference signal (PRS) to a first type of user equipment (UE), wherein resource blocks (RBs) outside the first bandwidth are used for signals other than the first PRS;
   determining a second bandwidth within the system bandwidth to transmit a second PRS to a second type of UE, wherein RBs outside of the second bandwidth are used for signals other than the second PRS; and
   transmitting information associated with the first PRS and the second PRS.

2. The method of claim 1, wherein the first type of UE comprises a narrowband UE capable of narrowband communication with the network on a narrowband region of a larger system bandwidth, and wherein the first bandwidth comprises the narrowband region of the larger system bandwidth.

3. The method of claim 1, wherein the second type of UE comprises a wideband UE not capable of narrowband communication with the network.

4. The method of claim 1, further comprising determining a first periodicity for transmitting the first PRS and a second periodicity for transmitting the second PRS, and wherein the first periodicity for transmitting the first PRS is more frequent than the second periodicity for transmitting the second PRS.

5. The method of claim 1, wherein:
   the information associated with the first PRS comprises information indicating the first bandwidth to receive the first PRS, a periodicity at which the first PRS is to be transmitted, a muting pattern for the first PRS, and a number of consecutive subframes for receiving the first PRS; and
   the information associated with the second PRS comprises information indicating the second bandwidth to receive the second PRS, a periodicity at which the second PRS is to be transmitted, a muting pattern for the second PRS, and a number of consecutive subframes for receiving the second PRS.

6. The method of claim 5, wherein the information further comprises an offset between the first bandwidth and the second bandwidth, and wherein transmitting comprises transmitting the information associated with the first PRS and the second PRS to the first type of UE and the second type of UE.

7. The method of claim 5, further comprising transmitting the information associated with the first PRS and the second PRS to the first type of UE, and transmitting the information associated with the second PRS to the second type of UE.

8. The method of claim 5, wherein the information indicates a bandwidth representing a minimum of the first PRS and the second PRS, and further comprising transmitting the information indicating a bandwidth representing a minimum of the first PRS and the second PRS to the first type of UE.

9. The method of claim 1, wherein the information comprises information indicating at least one of:
   a periodicity at which the first PRS and the second PRS is to be transmitted;
   a bandwidth to receive the first PRS, a muting pattern for the first PRS, and a number of consecutive subframes for receiving the first PRS; or
   a bandwidth to receive the second PRS, a muting pattern for the second PRS, and a number of consecutive subframes for receiving the second PRS.

10. The method of claim 1, further comprising using resource blocks outside of the first bandwidth and the second bandwidth to transmit at least one of unicast or broadcast channels.

11. The method of claim 1, wherein transmitting the information associated with the first PRS and the second PRS comprises:
   transmitting the information to the second type of UE, wherein the information comprises information indicating the second bandwidth and a number of consecutive subframes for receiving the second PRS; and
transmitting the information to the first type of UE, wherein the information comprises a bitmask indicating narrowband subframes in which to receive the first PRS.

12. The method of claim 1, wherein the first bandwidth and the second bandwidth are centered around a center of the system bandwidth.

13. The method of claim 1, wherein:
at least one of the first bandwidth or the second bandwidth is not centered around a center of the system bandwidth; and
the information comprises information indicating a frequency offset for at least one of the first bandwidth or the second bandwidth, indicating how much the first bandwidth or the second bandwidth is shifted from the center of the system bandwidth.

14. The method of claim 1, wherein:
at least one of the first bandwidth or the second bandwidth is not centered around a center of the system bandwidth;
the information comprises a subband PRS muting indication, indicating where, in the first bandwidth or in the second bandwidth, PRS is muted; and
the subband PRS muting indication is unique to a base station.

15. An apparatus for wireless communications in a network, comprising:
at least one processor configured to:
determine a first bandwidth within a larger system bandwidth to transmit a first positioning reference signal (PRS) to a first type of user equipment (UE), wherein resource blocks (RBs) outside the first bandwidth are used for signals other than the first PRS;
determining a second bandwidth within the system bandwidth to transmit a second PRS to a second type of UE, wherein RBs outside of the second bandwidth are used for signals other than the second PRS;
a memory coupled with the at least one processor; and
a transmitter configured to transmit information associated with the first PRS and the second PRS.

16. The apparatus of claim 15, wherein the first type of UE comprises a narrowband UE capable of narrowband communication with the network on a narrowband region of a larger system bandwidth, and wherein the first bandwidth comprises the narrowband region of the larger system bandwidth.

17. The apparatus of claim 15, wherein the second type of UE comprises a wideband UE not capable of narrowband communication with the network.

18. The apparatus of claim 15, wherein the at least one processor is further configured to determine a first periodicity for transmitting the first PRS and a second periodicity for transmitting the second PRS, and wherein the first periodicity for transmitting the first PRS is more frequent than the second periodicity for transmitting the second PRS.

19. The apparatus of claim 15, wherein:
the information associated with the first PRS comprises information indicating the first bandwidth to receive the first PRS, a periodicity at which the first PRS is to be transmitted, a muting pattern for the first PRS, and a number of consecutive subframes for receiving the first PRS; and
the information associated with the second PRS comprises information indicating the second bandwidth to receive the second PRS, a periodicity at which the second PRS is to be transmitted, a muting pattern for the second PRS, and a number of consecutive subframes for receiving the second PRS.

20. The apparatus of claim 19, wherein the information further comprises an offset between the first bandwidth and the second bandwidth, and wherein the transmitter is further configured to transmit the information associated with the first PRS and the second PRS to the first type of UE and the second type of UE.

21. The apparatus of claim 19, wherein the transmitter is further configured to transmit the information associated with the first PRS and the second PRS to the first type of UE, and transmitting the information associated with the second PRS to the second type of UE.

22. The apparatus of claim 19, wherein the information indicates a bandwidth representing a minimum of the first PRS and the second PRS, and wherein the transmitter is further configured to transmit the information indicating a bandwidth representing a minimum of the first PRS and the second PRS to the first type of UE.

23. The apparatus of claim 15, wherein the information comprises information indicating at least one of:
a periodicity at which the first PRS and the second PRS is to be transmitted;
a bandwidth to receive the first PRS, a muting pattern for the first PRS, and a number of consecutive subframes for receiving the first PRS; or
a bandwidth to receive the second PRS, a muting pattern for the second PRS, and a number of consecutive subframes for receiving the second PRS.

24. The apparatus of claim 15, wherein the at least one processor is further configured to use resource blocks outside of the first bandwidth and the second bandwidth to transmit at least one of unicast or broadcast channels.

25. The apparatus of claim 15, wherein the transmitter is configured to transmit the information associated with the first PRS and the second PRS by:
transmitting the information to the second type of UE, wherein the information comprises information indicating the second bandwidth and a number of consecutive subframes for receiving the second PRS; and
transmitting the information to the first type of UE, wherein the information comprises a bitmask indicating narrowband subframes in which to receive the first PRS.

26. The apparatus of claim 15, wherein the first bandwidth and the second bandwidth are centered around a center of the system bandwidth.

27. The apparatus of claim 15, wherein:
at least one of the first bandwidth or the second bandwidth is not centered around a center of the system bandwidth; and
the information comprises information indicating a frequency offset for at least one of the first bandwidth or the second bandwidth, indicating how much the first bandwidth or the second bandwidth is shifted from the center of the system bandwidth.

28. The apparatus of claim 15, wherein:
at least one of the first bandwidth or the second bandwidth is not centered around a center of the system bandwidth;
the information comprises a subband PRS muting indication, indicating where, in the first bandwidth or in the second bandwidth, PRS is muted; and
the subband PRS muting indication is unique a base station.

29. An apparatus for wireless communications in a network, comprising:
- means for determining a first bandwidth within a larger system bandwidth to transmit a first positioning reference signal (PRS) to a first type of user equipment (UE), wherein resource blocks (RBs) outside the first bandwidth are used for signals other than the first PRS;
- means for determining a second bandwidth within the system bandwidth to transmit a second PRS to a second type of UE, wherein RBs outside of the second bandwidth are used for signals other than the second PRS; and
- means for transmitting information associated with the first PRS and the second PRS.

30. A non-transitory computer readable medium for wireless communications in a network, comprising:
- instructions that, when executed by at least one processor, configure the at least one processor to:
  - determine a first bandwidth within a larger system bandwidth to transmit a first positioning reference signal (PRS) to a first type of user equipment (UE), wherein resource blocks (RBs) outside the first bandwidth are used for signals other than the first PRS;
  - determine a second bandwidth within the system bandwidth to transmit a second PRS to a second type of UE, wherein RBs outside of the second bandwidth are used for signals other than the second PRS; and
  - transmit information associated with the first PRS and the second PRS.

31. A method for wireless communication in a network, comprising:
- receiving configuration information, wherein the configuration information comprises:
  - for a first type of user equipment (UE), a first indication of a first bandwidth within a larger system bandwidth to receive a first positioning reference signal (PRS), wherein resource blocks (RBs) outside the first bandwidth are used for signals other than the first PRS; and
  - for a second type of UE, an indication of a second bandwidth within the system bandwidth to receive a second PRS, wherein RBs outside of the second bandwidth are used for signals other than the second PRS; and
- receiving at least one of the first PRS or the second PRS based, at least in part, on the configuration information.

32. The method of claim 31, wherein the first type of UE comprises a narrowband UE capable of narrowband communication with the network on a narrowband region of a larger system bandwidth, and wherein the first bandwidth comprises the narrowband region of the larger system bandwidth.

33. The method of claim 31, wherein the second type of UE comprises a wideband UE not capable of narrowband communication with the network.

34. The method of claim 31, wherein the first PRS is transmitted at a first periodicity and the second PRS is transmitted at a second periodicity, and wherein the first periodicity for transmitting the first PRS is more frequent than the second periodicity for transmitting the second PRS.

35. The method of claim 31, wherein the configuration information further comprises at least one of:
- a periodicity at which the first PRS is to be transmitted, a muting pattern for the first PRS, and a number of consecutive subframes for receiving the first PRS; or
- a periodicity at which the second PRS is to be transmitted, a muting pattern for the second PRS, and a number of consecutive subframes for receiving the second PRS.

36. The method of claim 35, wherein the configuration information further comprises an offset between the first bandwidth and the second bandwidth.

37. An apparatus for wireless communication in a network, comprising:
- at least one processor configured to:
  - receive configuration information, wherein the configuration information comprises:
    - for a first type of user equipment (UE), a first indication of a first bandwidth within a larger system bandwidth to receive a first positioning reference signal (PRS) wherein resource blocks (RBs) outside the first bandwidth are used for signals other than the first PRS; and
    - for a second type of UE, an indication of a second bandwidth within the system bandwidth to receive a second PRS, wherein RBs outside of the second bandwidth are used for signals other than the second PRS; and
  - receive at least one of the first PRS or the second PRS based, at least in part, on the configuration information.

* * * * *